Jan. 16, 1940.  L. E. GOFF ET AL  2,187,710
WOOD CELLULOSE AND METHOD OF PRODUCING SAME
Filed May 26, 1936  2 Sheets-Sheet 1
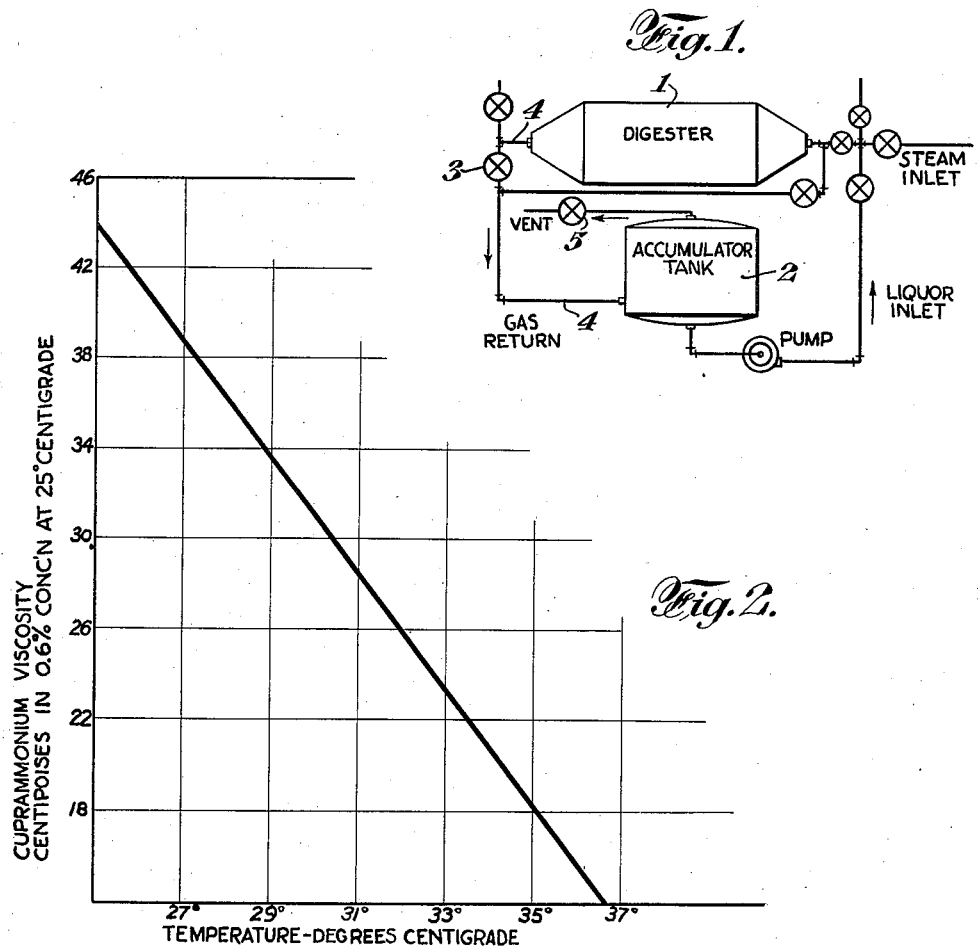
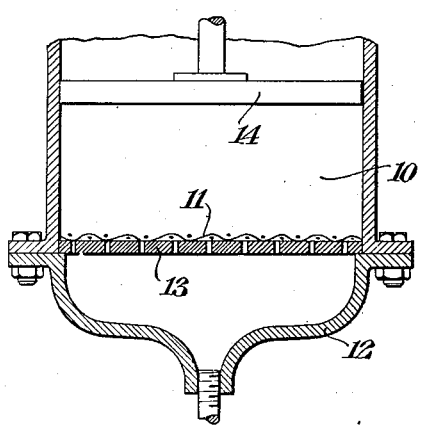
INVENTORS
LIONEL ELMER GOFF
LYLE MELVIN SHELDON
MILTON LAWRENCE HERZOG
FREDRICH OLSEN
BY
ATTORNEYS Jan. 16, 1940. L. E. GOFF ET AL 2,187,710
WOOD CELLULOSE AND METHOD OF PRODUCING SAME
Filed May 26, 1936   2 Sheets-Sheet 2
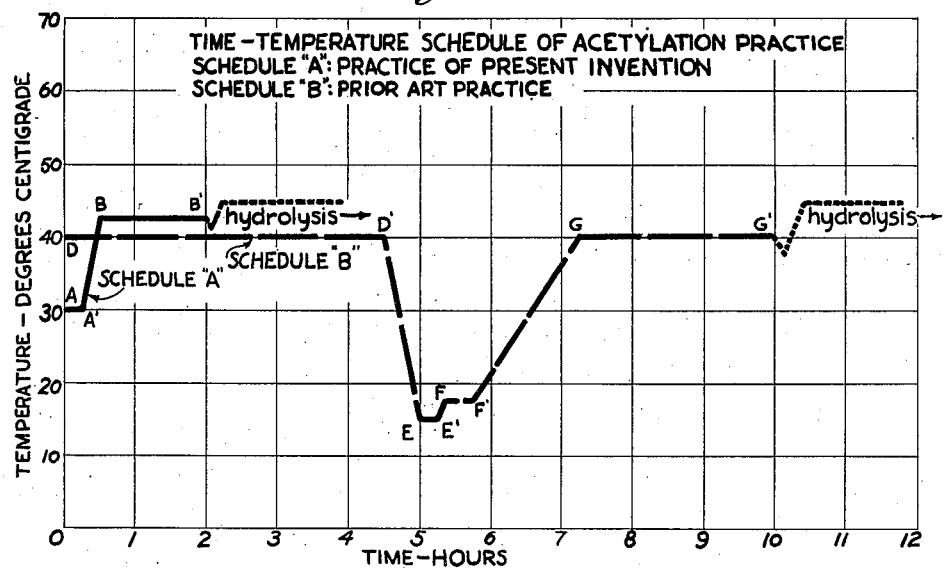
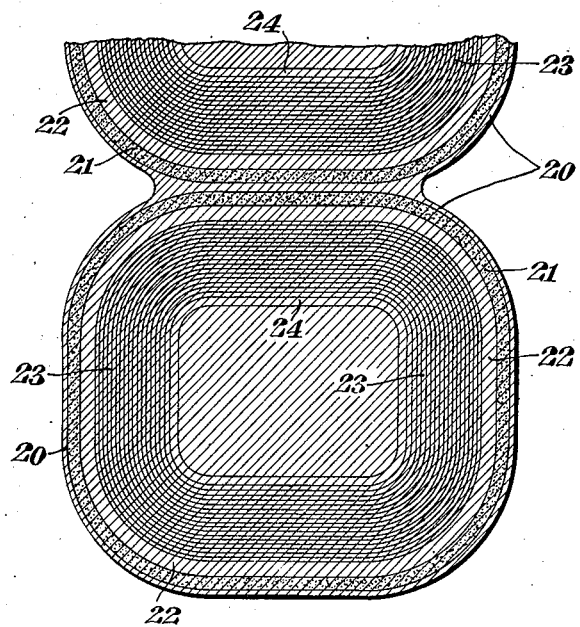
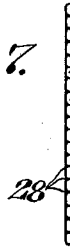
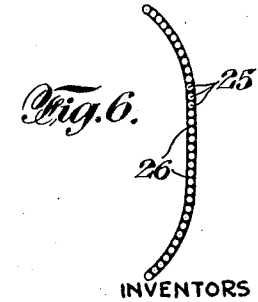
INVENTORS
LIONEL ELMER GOFF
LYLE MELVIN SHELDON
MILTON LAWRENCE HERZOG
FREDRICH OLSEN
BY
ATTORNEYS Patented Jan. 16, 1940

REISSUED
NOV 4- 1941

2,187,710

UNITED STATES PATENT OFFICE 2,187,710

WOOD CELLULOSE AND METHOD OF PRODUCING SAME

Lionel Elmer Goff, Lyle Melvin Sheldon, Milton Lawrence Herzog, and Fredrich Olsen, East Alton, Ill., assignors to The Cellulose Research Corporation, East Alton, Ill., a corporation of Delaware Application May 26, 1936, Serial No. 81,845

3 Claims. (Cl. 260—229)

This invention relates to cellulose, and with regard to certain more specific features, to wood cellulose and its derivatives, and the manufacture thereof.

Among the several objects of the invention may be noted the provision of a novel wood cellulose product which may be used as a base material for conversion into derivatives, such as cellulose acetate, for example, to supplant the purified cotton linters heretofore used.

A further object of the invention is the provision of a method of manufacturing wood cellulose of the class described, the method being capable of being carried out with extreme economy, and the method being adaptable to a variety of controls or alternative procedures whereby the complexity of the method may be reduced when the quality of the cellulose product need not be so high.

Still a further object of the invention is the provision of a new method of economically converting relatively low-purity cellulose into cellulose derivatives, such as cellulose esters, ethers, mixed esters and the like.

Still a further object of the invention is the provision of a method of manufacturing cellulose of the class described which is flexible in that it can ideally be adapted for the production of a cellulose of any desired degree of purity.

Still a further object of the present invention is the provision of cellulose derivatives, such as cellulose acetate, which are highly homogeneous and are substantially free from the products of acetolysis.

Still a further object of the present invention is the provision of an unmercerized wood cellulose product which is capable of conversion into a cellulose derivative, such as cellulose acetate.

In the accompanying drawings, which illustrate certain features of the present invention, Fig. 1 is a diagram showing an accumulator tank and a digester, and connections therebetween;

Fig. 2 is a graph showing the relations between temperature and reduction of cuprammonium viscosity of pulps, treated for a predetermined time with calcium hypochlorite solution of a predetermined concentration;

Fig. 3 is a diagrammatic vertical section of a batch dehydration vessel;

Fig. 4 is a graph illustrating time-temperature schedule for an acetylation procedure of the present invention, as compared with a current commercial acetylation procedure;

Fig. 5 is a diagrammatic cross-section of wood fibers;

Fig. 6 is an enlarged cross-section showing the arrangement of fibrils in the lamina of a fiber such as one shown in Fig. 5; and, Fig. 7 is a diagrammatic longitudinal section of a fibril, such as the fibrils shown in Fig. 6.

It is one of the primary purposes of the present invention to provide a cellulose that is capable of conversion into derivatives, even though the cellulose be of a relatively low order of purity in the chemical sense.

The factors or analyses normally set forth for celluloses (such as the "alpha cellulose content", the "soda soluble content", the "ash", and the like), we have found, are not the only factors determining the capability of a cellulose for conversion into derivatives. Other factors, as will be described more fully hereinafter, are not at present capable of a precise evaluation, but it is nevertheless true that they are important factors, and, in a large measure, determinative of the adaptability of a cellulose to acetylation or other processes of forming derivatives. We have further found that if these other factors are satisfactorily complied with, then the chemical purity of the cellulose need not necessarily be very high in order that the cellulose be capable of acetylation or the like.

The nature of a cellulose product is dependent in a large manner on the process by which such product has been produced from its raw material. For example, it is important in the processes by which wood is purified into wood cellulose, that the digestion and purification treatments be such as will not in themselves add any appreciable quantities of soda soluble material and/or hydrated or other degradation products at the expense of the unfavorable depolymerization or other degradation of the alpha cellulose component of the wood. Such products of degradation, we have found, if dried, tend to form irreversible gels which block or seal the network of capillary channels in the fiber structure resulting from the removal of the matrix material originally existing in the wood. The prior art digestion and purification methods for providing wood cellulose include treatments of such drasticity as to result inevitably in a severe degradation of the cellulose in the foregoing particulars and costly loss of native alpha cellulose.

We have, through long and involved research, determined that there are certain definite requirements that must be met before a wood cellulose is capable of satisfactory acetylation, or esterification, or conversion into other derivatives. These requirements include at least four apparently interdependent properties, namely, (1) purity, (2) permeability, (3) a favorable chemical condition of the cellulose fibers to permit adequate reactivity with the acetylating reagent, and (4) a favorable physico-chemical condition of the cellulose fibers, which is possibly related to the state or extent of polymerization of the cellulose molecules in the fibers. The proper attainment of conditions represented by these four requirements apparently provides the key to the production of a wood cellulose capable of being readily, uniformly, and economically converted into cellulose acetate or other derivatives. Of the above four factors, purity of the cellulose appears to be of lesser importance where color of the cellulose derivative product is not so important. In other words, if the other three factors appear to be favorable, then the cellulose may be capable of being converted into cellulose acetate or other derivatives even though the color of such derivatives will suffer as a result of the lack of purity of the cellulose. Since, as has been intimated before, by no means all of the uses for cellulose derivatives impose a requirement of very low color on such derivatives, celluloses capable of being readily acetylated have a wide field of commercial utility even though the color of the solution of the derivatives is relatively high.

Because the meaning of certain terms frequently employed in the cellulose art is somewhat obscure, depending upon the individual interpretation of analytical evaluative methods, it is considered advisable, before proceeding further with the description of the present invention, to define certain of the terms used herein:

"Cuprammonium viscosity", as used herein, means the viscosity number or value obtained according to the following method: The cuprammonium solution was prepared by the action of air on electrolytic copper in the presence of strong ammonia water. The copper concentration of the solutions employed for viscosity determinations was 30 g. ±2 g. per liter. The concentration of cellulose employed was 0.6 g. (oven dry basis) per 100 cc. of cuprammonium solution. The cellulose sample for this determination was dried at 70° C. to 4% moisture content. After weighing out 0.6 g. (oven dry basis), the sample was moistened, squeezed to a uniform weight of 2 g. and then dispersed in cuprammonium solution in an atmosphere of hydrogen from which oxygen has been completely removed. The viscosity measurements were made at 25° C. with a modified Ostwald pipet, constructed according to the specifications of the American Chemical Society Committee on the Viscosity of cellulose (Journal of Industrial and Engineering Chemistry, I, 49; 1929). The time of flow in seconds was converted to centipoises on the basis of the calibration of the pipet with oils of known viscosity in centipoises obtained from the United States Bureau of Standards. "Centipoises" is frequently abbrevited herein to ctps.

"Alpha cellulose", as used herein, is defined as that portion of a sample of cellulosic material not dissolved by 17.5% sodium hydroxide solution at 20° C., determined by the following method:

A 1.0–1.2 g. of cellulose representative of the lot to be tested is weighed in a closed weighing bottle on an analytical balance. The moisture content of the air dry material, from which the sample is taken, is accurately determined for the purpose of calculating the oven dry weight of sample used. The sample is transferred to a 250 cc. beaker. 10 cc. of 17.5% ±0.1 carbonate free NaOH solution is added to the sample in the beaker. The beaker is set in a water bath kept at 20° C. After the caustic has been on the sample two minutes, the sample is macerated with the glass rod. At each five-minute interval after the caustic is first added, 5 cc. portions of the caustic solution are added until the total amount is 25 cc. The sample is macerated after each addition of caustic. After the addition of the last 5 cc. portion, the sample is allowed to stand in the 20° C. bath for 30 minutes. At the end of the thirty-minute period, the sample is diluted with 42 cc. of distilled water at 20° C., with thorough stirring. At the end of 5 minutes after dilution, the slurry is quantitatively transferred to a tared "Jena" glass crucible, with a fritted glass bottom and the solution filtered off.

250 cc. of distilled water at 20° C. are placed in a wash bottle. Small portions of this are used to wash any residue in beaker into the crucible. This is accomplished by not only running water through the pulp mat, but also by breaking the vacuum on the crucible and agitating the pulp in 20–25 cc. of the water with a glass stirring rod. The vacuum is again applied and the solution drawn off the pulp. This is repeated three or four times, pressing the pulp mate down after each agitation. The last of the 250 cc. of water is used to wash any residue off the stirring rod into the crucible and to wash any fibres adhering to the sides of the crucible down into the pulp mat.

15 cc. of 10% acetic acid solution is then drawn down into the pulp and, after breaking the vacuum is allowed to stand three minutes. The sample is then washed with distilled water at 20° C. until the filtrate is neutral to litmus. 250 cc. of excess $H_2O$ at 20° C. is then drawn thrown the sample. The crucible containing the sample is placed in a tared weighing bottle in the oven at 105° C. and left in the oven for three hours. At the end of the three hour period, the weighing bottle is covered, desiccated in an $H_2SO_4$ desiccator to room temperature, and weighed accurately on an analytical balance. The bottle is then returned to the oven, uncovered, and the sample again further dried. The sample is desiccated and weighed at hour intervals until constant, or an increase in weight is obtained.

"Soda soluble material", as used herein, is defined as that portion of a cellulosic sample dissolved when it is subjected to the action of 7.14% NaOH solution at the boiling point of water for three hours by the following procedure:

Approximately 2.2 grams of the air dry cellulose is accurately weighed in a tarred weighing bottle on an analytical balance. The sample is then quantitatively removed from the weighing bottle and placed in a 250 cc. Erlemeyer flask.

100 cc. of 7.14% ±.05 NaOH solution, free of $Na_2CO_3$ (the sodium hydroxide solution is prepared by dissolving solid alkali in an equal weight of water, and allowing to stand until the suspended material has settled out, leaving the supernatant liquor clear. The liquor is then decanted off the material which settled out, and is used to make up the 7.14% NaOH solution), is added to the sample in the flask. The flask is fitted with an air condenser (a glass tube, 6 mm. inside diameter by 60 cm. long) by means of a rubber stopper. The flask is then put into a vigorously boiling water bath, so that the water level of the bath is about one inch above the level of liquid inside the flask. This water level is maintained throughout the test by adding boiling water to the bath as needed. The water of the bath should be kept boiling throughout the test.

At the end of exactly three hours after the flask is placed in the bath, the sample is quantitatively poured into 300 cc. of distilled water containing a few drops of alcoholic phenolphthalein in a two or three liter beaker. Concentrated acetic acid is added rapidly, stirring, until the indicator just changes color. 5 cc. excess concentrated acetic acid is then added. The acidified solution is filtered on a tared "Jena" glass crucible, with fritted glass bottom.

The residue is washed with distilled water at 50° C. until the filtrate is neutral to litmus. This is accomplished by breaking the vacuum and carefully stirring the sample with a glass stirring rod in the crucible in 20–25 cc. of the 50° C. distilled water. After the last agitation, any fibers adhering to the glass stirring rod or walls of the crucible are carefully washed down into the pulp mat. This is repeated as often as necessary to wash the acid from the sample.

The crucible is then placed in a tared weighing bottle and the material is dried to constant weight as described in the alpha cellulose procedure above. The loss of weight of the sample is determined by subtracting the final dry weight of the cellulose from the original dry weight of the cellulose. The percent soda soluble is calculated by multiplying the loss in weight by 100 and dividing by the weight of oven dry sample.

"Bleachability of cellulose", as used herein, is a measure of the materials oxidizable by potassium permanganate in the presence of an acid, and is expressed in terms of standard bleaching powder containing 35% available chlorine. The determination consists of treating a 1-gram sample of material completely dispersed in 750 cc. of a solution composed of 0.133 N sulfuric acid and N/300 potassium permanganate for 5 minutes at 25° C.; reacting the unconsumed potassium permanganate with potassium iodide, and back titrating with sodium thiosulfate. A detailed description of the method, including the conversion table for expressing the permanganate number in terms of percent bleaching powder of 35% available chlorine, was published by T. A. P. P. I., Series XVII, #1, 146 (1934), "Permanganate number of pulp" by R. N. Wiles.

Briefly, the process of the present invention comprises subjecting any wood which readily lends itself to pulping to a series of chemical treatments comprising digestion, a treatment with chlorine, hypochlorite bleaching, and hot alkaline treatments, all of which steps are designed and controlled to attain cellulose fibers of uniform permeability and sufficiently high purity and at the same time to restrict the cellulose degradation to a minimum. The water in the purified fibers is then replaced with a water miscible organic liquid in such a manner as to prevent any loss in the inherent permeability of the cellulose and to promote its reactivity toward esterifying reagents. The cellulose as thus dehydrated is then acetylated, for example, in a period of the order of four hours or less at a temperature of about 40° C. using about 2.2 parts or less of acetic anhydride to each part of cellulose (oven-dry basis). No degrading pretreatment with mineral acids or the like is involved in the present process, (as is the usual case with cotton linters), and very mild acetylating conditions are employed, resulting in a homogeneous high quality cellulose acetate product suitable for many uses, such as for plastics, yarn, sheeting and liquid coating compounds.

The first step of the process of the present invention comprises subjecting a wood, in a suitable state of subdivision, to a digestion procedure. As raw materials, the present invention is capable of utilizing any species of wood which can be properly pulped and digested. For example, coniferous wood such as spruce, hemlock, fir, and pine, as well as deciduous wood such as gum, maple, birch and poplar, can all be used. The wood is preferably selected so that it has a minimum of knots, decayed portions, or dried or seasoned wood. The selected wood is debarked and subdivided into flakes or chips, such that a uniform mass of permeable, water-wet wood is provided.

In order to obtain a maximum of purification with a minimum of cellulose degradation, high yields, and high quality, it is advisable to have the reagents react, in all stages of the process, uniformly throughout the wood. This is accomplished by having the delignifying and purification reagents distributed uniformly through the wood pulp or fibrous structure before any appreciable reaction occurs. This principle of uniform distribution and reaction is preferably applied to every treatment to which the wood, the pulp resulting therefrom, and the progressively purified fibers are subjected.

The subdivided wood may be preimpregnated with water or cooking liquor before digestion, or the initial stages of the digestion may be so designed and controlled that the cooking liquor penetrates the wood completely and uniformly, with special reference to the chemical reagents, before temperatures of rapid reaction are reached. Preimpregnation may be accomplished, for instance, by boiling the wood to completely remove the air from its interstices, and then condensing the steam content with a subsequent flow of cooking liquor into the interstices by increasing the pressure on the liquid surrounding the wood, or by cooling below 100° C.

For acid digestion either calcium, sodium, or ammonium bisulfite base liquors, or any other suitable digestion liquor, may be used. The initial stages of the digestion may be controlled so that the air is completely removed from the wood (if this has not already been done by a preimpregnation) by a series of short gas reliefs from the digester in the range of the order of 100° to 110° C., at which temperatures water tends to flash into steam and thus flushes the air out of the wood. When the temperature and pressure on the surrounding medium is increased, the steam in the wood capillaries tends to condense, causing the liquor to flow uniformly into the wood. It has been found desirable to carry out the greater part of the digestion reaction in the neighborhood of 120° C., where the sulfonation reaction occurs at a satisfactory rate, but without deleterious effects on the pulp. After sulfonation is completed, it is desirable to increase the temperature to as high as the order of 135° to 145° C., for a relatively short period. This apparently results in hydrolysis or solution of a maximum amount of non-cellulose impurities.

After completing the digestion, we prefer to wash the reaction products from the pulp with a minimum contact of the pulp with air or light rays. This is usually done by washing the pulp while still in the digester.

It is advisable that the digested, wet pulp be completely defibered (that is, every fiber separated from its neighbor) in order to secure a uniform treatment in the succeeding purification steps.

As a first step in the purification following digestion, it has been found desirable to remove ligneous and other non-cellulosic material by means of a mild treatment with chlorine water. This may be accomplished by bubbling a known amount of chlorine gas into a pulp and water slurry under violent agitation. The amount of chlorine used depends upon the degree to which the pulp has been purified in the digestion. For instance, it has been found especially desirable to use an amount of chlorine (in pounds per 100 pounds of oven-dry pulp) equivalent to 16% of the bleachability value of the pulp (as determined by the permanganate method hereinbefore set forth). Such a chlorination results in a maximum removal of impurities and an increase in porosity with a minimum of cellulose degradation, and a minimum consumption of chlorine.

Within the customary ranges of bleachability of the raw pulp (for example, between 15% and 35%) this factor of 16% (used in computing the number of pounds of chlorine to be added) results in the addition of sufficient chlorine to effect a rapid and complete chlorination of the ligneous material without waste of chlorine and has the further important effect of bringing raw pulps of widely varying properties to an unexpected degree of uniformity after the products of the chlorination have been removed by the subsequent causticizing treatment. Thus the variations in the raw pulp due to the normal fluctuations in the quality of the wood supply occasioned by differences in the age of the trees, moisture content, different proportions of sapwood and heartwood, and locality in which the wood has been grown, variations in pulping control between digester batches, and other factors not generally feasible in practice to regulate, are leveled out.

After the chlorination treatment, the cuprammonium viscosity value of the pulp in the successive stages of its purification appears to be a very satisfactory criterion for the control of the uniformity of the product as between successive batches. For example, for a given end product, a definite schedule of viscosities after each succeeding step may be set up, and adhered to throughout successive batches, yielding substantially identical products even with wide variations in raw materials. Relatively slight departures from the scheduled viscosities are apparently reflected in appreciable differences in the final product characteristics, including its viscosity.

Further, control of viscosity during a chemical treatment of the cellulose allows the treatment to be terminated before any appreciable degradation occurs. In treatments in which there is a reduction of viscosity, the reduction is usually very rapid at the start. However, after a period of time depending on the conditions of the treatment, the rate of viscosity reduction decreases appreciably and is usually accompanied by a reduction of alpha cellulose content and an increase in soda soluble content of the cellulose. The first rapid drop in cellulose viscosity can usually be accomplished without suffering any substantial degradation and it is preferred to terminate such treatments before degradation does occur. Such control results in a product of high purity and reactivity.

The cellulose after chlorination is ordinarily washed with hot or cold alkali in order to remove the reaction products.

The next step ordinarily comprises bleaching the washed, chlorinated pulp. Bleaching treatments, when carried out after such a chlorination treatment, need be only very mild in character to accomplish the desired further purification. It has been found convenient to hold the variables of concentration, time, and pH constant during bleaching and to obtain the desired result by varying the temperature. However, this is not necessary as long as the desired reduction of viscosity is accomplished without degrading or lowering the permeability of the cellulose. The bleaching reagent used may be any of the usual ones such as calcium or sodium hypochlorite.

Upon the completion of the bleaching, the products of reaction are thoroughly washed out of the pulp with water.

As a step following the bleaching, a hot alkaline treatment has been found especially desirable for removing certain types of non-cellulosic material and for increasing the permeability and reactivity of the cellulose product. In carrying out such treatments, it has been found desirable to use caustic soda of less than the order of 10% concentration, for economy in both reagents and in the product yield. It is also desirable to proceed in such manner that the exposure of the cellulose to the air is held to a minimum, because air oxidation has a tendency to affect the uniformity of the cellulose product, and to introduce an uncontrolled factor resulting in increased difficulty in the control of subsequent steps, and to produce ultimately a less satisfactory cellulose derivative product. The temperature of the caustic treatment may vary from the order of 30° C. to the order of 120° C., and the time from the order of 15 minutes to the order of 3 hours, depending on the purity of the pulp treated and the viscosity desired in the end product.

The wet, highly permeable cellulose produced as above is now ready for esterification. Any drying of the cellulose to less than the order of 40% water content is desirably avoided. The inherent permeability and reactivity of the cellulose is preserved by displacing the water in the cellulose with a water-miscible liquid such as acetic acid. This may be accomplished by the process described in the copending application of Sheldon et al., Serial No. 70,372, filed March 23, 1936. The dehydration process therein described comprises forming the wet cellulose into a mat, cake or sheet of uniform density and then displacing the water contained therein by glacial acetic acid applied as a liquid piston. As the water is displaced, it is simultaneously replaced with acetic acid and as a consequence no shrinkage or reduction in permeability of the fiber occurs. Relatively hot glacial acetic acid, such as that at temperatures of the order of 30° to 75° C. may be used for the dehydration, since such a practice results in a material improvement in the reactivity of the cellulose toward the subsequently applied acetylating reagents.

The mass of acetic acid-wet cellulose is then cooled to less than 40° C. and acetic acid containing a catalyst such as sulfuric acid is uniformly mixed into the mass, usually in a period of not more than the order of 15 minutes. Of the order of 2.2 parts of acetic anhydride, or less, are then incorporated in the mass. Acetylation then proceeds, usually in less than 4 hours, yielding a homogeneous cellulose triacetate distinguished by its freedom from unacetylated particles and absence of products of acetolysis or other degradation products is another important feature of the present invention.

The cellulose triacetate is then hydrolyzed by well-known methods until solubility in acetone has been attained, or the desired combined acetic acid content is reached. The hydrolysis is terminated by the addition, for example, of sodium acetate in acetic acid solution. The acid solution of acetate may then be filtered and precipitated, washed free of acid, and dried.

The cellulose acetate obtained from wood by the above described process is suitable for plastics, yarn sheeting, or liquid coating compounds, and wherever else an especially pure acetate product is not necessary.

In the following example, black gum wood is selected for the raw material. This wood lends itself particularly well to the production, in high yields, of highly permeable cellulose suitable for esterification and particularly for the production of cellulose acetate.

The natural moisture content of the wood is maintained as nearly as possible by using freshly cut wood and maintaining the protecting bark on the logs until ready for chipping or other subdividing. The bark is then removed and the logs are thoroughly washed free of bark and dirt and cut into chips, preferably approximately ¼ inch long. The wood may be cut into flakes, if desired, about one inch long and approximately .020 to .030 inch in thickness.

The wood in the subdivided form is charged into a digester 1 (Fig. 1), which is preferably of the rotary type and constructed of a corrosion-resistant material, such as chrome-nickel-steel, equipped with means for injecting both steam and acid while either stationary or rotating. The treating liquor comprises, for example, ammonium bisulfite having an excess of free sulfurous acid, the composition having a total $SO_2$ content of about 4.45% and a combined $SO_2$ content of about 1.1%. The ratio of treating liquor to wood employed is about 6.0 pounds of liquor to 1.0 pound of oven dry wood. The ammonium bisulfite liquor is preferably preheated in a separate accumulator tank 2 to a temperature of approximately 90° C., which results in a pressure of approximately 30 pounds per square inch, provided susbtantially no air is in the accumulator 2.

Steam is added to the digester 1 prior to the addition of the cooking liquor, until the digester and its contents have been heated to a temperature of approximately 60° C., during which heating period the digester is rotated continuously. The pressure which develops from this preheating, largely due to the expansion of the heated air in the wood and the digester, amounting to approximately 10 pounds per square inch, is released before the liquor is added from the accumulator tank 2. The correct volume of cooking liquor (taking into account the moisture content of the wood), preheated to about 90° C., is then pumped into the digester 1, and steam is added until the entire charge is heated to about 90° C., at which temperature level it is held for the order of an hour. The pressure in the digester at this temperature is approximately 43 pounds per square inch, indicating the presence of a considerable amount of air. At the end of the one-hour period at 90° C. the temperature is raised, preferably at a uniform rate, to about 122° C., over a period of about two hours.

While the temperature passes through the 103° to 106° C. range, more or less, a series of short periods of gas relief (usually four of approximately 30 seconds each) is given by means of a valve 3 in the relief line 4 from the digester 1 to the accumulator tank 2, for the purpose of removing the remaining air still retained in the wood and in the digester. At the temperatures named, the entire contents of the digester are above the ebullition point of the cooking liquor at atmospheric pressure, hence when the relief valve 3 is opened, there is a rapid and uniform ebullition throughout the mass of chips and treating liquor, which effectively boils out any air remaining within the interstices of the wood. The height of the liquor and chip charge in the digester will influence the temperature level at which the gas relief is practiced, since increasing hydrostatic pressure, resulting from increased height of liquor and weight of chips, will increase the temperature at which ebullition of the cooking liquor at the bottom of the digester will take place when the relief valve 3 is open. During and after the boiling period the chips are desirably maintained continuously submerged, in order to retain the benefits of the prior exhaustion of the air from the wood.

The pressure at the time of the gas reliefs is usually about 63 pounds per square inch and during the series of reliefs it will drop about 15 to 20 pounds per square inch. This is due to and may be accepted as an indication that substantially all the air has been removed from the wood and the digester.

If desired an alternate method may be used in order to saturate the wood cavities with liquor. After the air has been removed from the wood and digester as just described by venting the digester at the 103°–106° C. point, saturation may be accomplished by cooling the contents slightly below 100° C. This effects a condensation of the steam within the wood and results in penetration of the liquor. After soaking the wood at less than 100° C. for say 30 minutes, the digestion may be continued as described.

The temperature is thereafter maintained at the order of 122° C. for about four hours. The pressure at this temperature level is approximately 65 pounds per square inch. Sulfonation of the noncellulosic components of the wood is in progress during this four-hour interval at the 122° C. temperature level, and at the end of this period sulfonation is substantially complete.

The characteristics of the pulp can be varied over a wide range by gas reliefs made early in the cook, for example, during the period at which the temperature is maintained constant at 121°–123° C. and also before this temperature level is reached. In order to produce pulp of the greatest possible uniformity, no $SO_2$ is released until susbtantially complete sulfonation of the noncellulosic components of the wood is effected, which reaction takes place at a very desirable rate at the 121°–123° C. temperature level. After the ligneous material is properly sulfonated, wide variations in gas relief can be made with substantially little variations in the characteristics of the end product. However, to duplicate pulp characteristics, close adherence to the predetermined temperature schedule during the latter stages of the cook is advisable since the rate of hydrolysis of the sulfonated ligneous components is readily affected by variations in temperature.

At the end of the four-hour sulfonation period, the temperature is raised to about 135° C. at a uniform rate over a period of about 1½ hours, and maintained at about 135° C. for about 2¼ hours. If the permissible pressures which may be employed in the digester are, for example, limited to 75 to 85 pounds per square inch, gas may be released from the digester while the temperature is being raised to 135° C., to prevent exceeding the allowable pressure limits. For example, the digester 1 Fig. 1 may have a pressure of 63 pounds per square inch and a temperature of 104° C., while the accumulator 2, which may be at approximately 30 pounds pressure and a temperature of 90°. Upon opening the relief valve 3, steam, sulfur dioxide vapors and air from the digester 1 will enter the accumulator 2. The pressure will increase in the accumulator 2 due to the increased temperature and the presence of air, but if a relief valve 5 is set at 40 pounds, air and sulfur dioxide may continuously escape through this open valve 5 and boiling will proceed in the digester 1 because of the differential pressure between the two vessels, and the fact that the temperature within the digester 1 is greater than the boiling point of the cooking liquor.

When the cooking schedule is completed, an economical recovery of a large portion of the sulfur dioxide present in the digester can be effected by releasing the pressure of the digester 1 through the accumulator tank 2 in the same manner as that described for the air release.

When the digestion is completed, the pressure in the digester is released and permitted to drop to substantially the pressure of water at the temperature of the pulp. The treating liquor is then drawn out of the digester and conveyed to the liquor recovery system. Water at about 100° C., and preferably as high as 150° C., is injected into the digester until it is approximately two thirds filled. The unwashed pulp is then mixed with the wash water by rotating the digester for about five minutes. The wash liquor is drawn off and the washing operation repeated until all soluble impurities have been removed and the pH of the pulp is between 6.0 and 8.0, for example, within which range it is maintained until the addition of chlorine in the first step of the subsequent purification treatment. Air is excluded from the pulp during the draining and washing operations until all sulfur dioxide has been removed and the pH of the pulp raised to the desired level.

After washing, the pulp is discharged from the digester into a dump tank, for example, and subjected to violent agitation to break down any fiber bundles which may exist into separate fibers.

By the foregoing cooking procedure we obtain of the order of 52 pounds or more of oven dried pulp from each 100 pounds of oven dry black gum wood used. A typical analysis of the washed pulp is as follows:

| | |
|---|---|
| Alpha cellulose | percent 86.0 |
| Soda solubles | do 25.0 |
| Cuprammonium viscosity | centipoises 45.7 |
| Bleachability | percent 23.0 |

If chips longer than one fourth inch be used, it is frequently desirable to modify the method of impregnation by first submerging and boiling the chips in water in the digester for about thirty minutes and then displacing the excess water from the bottom of the digester by means of superheated steam added above the liquor level. To keep the amount of water absorbed by the wood at a minimum, the water used for impregnation must be maintained at a vigorous boil during its displacement by the steam. The object is to avoid even a slight drop in the temperature of the water below the boiling point, since the amount of liquid absorbed by the chips would thereby be greatly increased and thus necessitate the use of much more concentrated digesting liquors to compensate for the excess water present. The steam with which the digester is filled condenses very readily, creating a vacuum within the digester and also within the interstices of the wood. The treating solution is then added and saturates the chips. By this procedure chips are freed of all air and impregnated with the cooking acid without first becoming saturated with water. Furthermore, the chips are impregnated not only with the sulfur dioxide, but with the base as well, since the liquor is drawn into the chips presumably in an unaltered form.

Preimpregnation of the wood with water may be omitted if desired, and the chips boiled in ammonium or other sulfite solution containing substantially no free sulfur dioxide. The desired composition of the treating solution is attained by adding the requisite amount of sulfur dioxide directly to the liquor into which the chips are submerged, after the impregnation has been accomplished.

After the washed, digested pulp has been thoroughly defibered it is transferred to a suitable chlorination tank preferably equipped with high efficiency agitation means, and which preferably can be tightly closed. The consistency of the pulp is adjusted to the order of 3% to 10% and the temperature to the order of 25° C. For the greatest economy in the use of the reagent, the pulp is treated with an amount of chlorine gas, in pounds per 100 pounds of oven-dry pulp, equivalent to about 16% of the bleachability value of the pulp as heretofore described.

The required amount of chlorine gas is incorporated in the pulp slurry at a uniform rate of flow over a period of the order of 20 to 30 minutes, with continuous agitation. The efficiency of the use of the chlorine is apparently increased by making the addition to the slurry in as short a time as possible. Care should be taken, however, that the addition of the chlorine gas is made under conditions which insure its uniform distribution throughout the unchlorinated pulp. The chlorine will be substantially exhausted in an additional 20 to 30 minutes but the treatment is allowed to continue for a total of about 45 minutes with sufficient agitation to allow the acids formed by the chlorination treatment to act upon the ash content of the cellulose.

At the end of the chlorination treatment a sufficient amount of sodium hydroxide is added to bring the concentration of the alkaline solution to about 1% in a treatment consistency of the order of 2% to 12%. It is desirable to keep the concentration of the actual sodium hydroxide solution being added to the pulp slurry after exhaustion of the chlorine at 7% or less, as stronger solutions coming in contact with the chlorinated pulp, even momentarily, have a tendency to "set" the chlorinated compounds and make them more difficult to remove. The pulp slurry is now brought to about 100° C. in about 20 to 30 minutes and held at about 100° C. for about 30 minutes. It is then promptly transferred to a continuous filter or centrifuge or the like and washed with water, and pH adjusted, if necessary, by the addition of hydrochloric acid or lime until it falls approximately within the range of 7.0 to 8.0.

In order to obtain uniformity of successive batches with the same regulated bleaching operation hereinafter described, it is desirable to control the pH at this point from batch to batch within the range stated, or within some other selected range of about 1.0 unit or less.

The washed pulp is now ready for a hypochlorite bleaching treament, the purpose of which is twofold: first, to eliminate residual coloring bodies or impurities which may have survived the chlorination and causticizing treatments: and second, to adjust the viscosity to the level required at this stage in the purification in order to yield the desired viscosity in the end product. For example, if a viscosity of 30 ctps. of the final purified product is desired, the pulp viscosity in the calcium hypochlorite treatment will be reduced to about 40 to 45 ctps., whereas, if an end product of a viscosity of 18 ctps. is desired, the viscosity is reduced by means of the bleaching treatment to approximately 25 to 30 ctps.

Fig. 2 illustrates treating conditions which may be selected for reducing the viscosity to any desired point by means of the hypochlorite bleach. For example, the required volume of calcium hypochlorite solution added to the pulp slurry, which may be at a consistency of 2.5% to 10%, to give a solution containing 0.16% bleaching powder calculated as containing 35% available chlorine, is determined. The proper amount of hypochlorite is then added to the pulp in the form of a solution containing 60 to 70 grams of bleaching powder per liter and saturated with lime. The viscosity of the pulp is then adjusted by regulating the temperature at which the reaction proceeds according to the graph of Fig. 2, which shows the temperature required for reducing the viscosity of the pulp to the desired level for a treatment employing a bleach time of four hours at a consistency of 2.7% and a bleach concentration of 0.16%.

After the completion of the bleach the pulp is washed with water until free from reagent and soluble reaction products.

When thoroughly washed, the pulp is dewatered by means of a suitable device, such as an Oliver filter employing press rolls, a screw press, or a centrifuge, until the consistency is at least of the order of 25%, at which consistency the pulp will be in cake form. The pulp cake is then added to a solution of caustic soda of such strength that, when mixed with the water held by the pulp, the equilibrium concentration will be of the order of 7%. The temperature of the caustic solution to which the pulp cake is added should be at least of the order of 50° but may vary anywhere in the range of the order of 50° to boiling temperature. The consistency at which the alkaline treatment may be carried out may vary between about 4% and about 12%, the proper consistency being entirely dependent upon the type and efficiency of the agitation equipment available. The treatment is allowed to proceed for about 1½ to about 3 hours at about 100° C., under conditions which allow a minimum amount of oxygen (such as air) to come in contact with the pulp. Following this treatment, the pulp is drained free of excess solution and washed with water until the pH has been reduced to the order of 7.0 to 8.0.

A typical analysis of the celluloses at this stage of the purification is as follows:

Alpha cellulose_____percent__ 94.1
Soda solubles_____do____ 4.0
Cuprammonium viscosity_____centipoises__ 18.0
Bleachability_____percent__ .5

This cellulose has been found satisfactory for conversion into cellulose acetate and may be dehydrated and acetylated by the practices presently to be described.

An alternate practice to the foregoing is to omit the 1% sodium hydroxide boiling treatment following the chlorination of the raw pulp. In this case, only a sufficient amount of sodium hydroxide is added to the chlorinated pulp to bring the pH of the slurry to the order of 7.0 to 8.0. When this has been accomplished the pulp is thoroughly washed with cold caustic solution or with water until the chlorinated compounds have been removed; it is then bleached and treated with a 7% sodium hydroxide solution as described above.

For attaining a product yielding slightly less colored derivatives, the pulp is given an additional mild bleach, for example, of the order of .5% to 2.0% calcium hypochlorite (based on the weight of the pulp present) given under conditions which have a minimum effect on the viscosity. This step is also useful where the very closest control of the viscosity in the end product is desired, as by selecting the proper temperature, time, concentration, and consistency, the purified pulp at this stage of its purification is susceptible to even more accurate control of the viscosity than in the first hypochlorite bleach. This bleaching is usually carried out at about 30° C. for about 2 hours, the actual conditions selected being determined by the desired end product viscosity, and by reference to a graph such as the graph of Fig. 2.

The pulp thus additionally bleached is washed free of chlorine and may then be dehydrated and acetylated according to the practice to be described. In some cases, where improved color is desired, the "fine" material is removed from the cellulose fibers, such as by classifying the pulp. This operation may be carried out at any convenient and economical step in the purification procedure. A satisfactory apparatus for classifying consists of a rubber-lined tank equipped with Allegheny metal agitation equipment and an 80 mesh Allegheny screen cover. A 1% to 2% slurry in water is fed continuously into the tank, the level being maintained at such a height that the agitation throws the slurry against the screen cover, and by imparting thereto a pulsating action, the fines are discharged through the screen. A typical analysis of the additionally bleached, washed, and classified pulp is as follows:

Alpha cellulose_____percent__ 96.7
Soda solubles_____do____ 4.8
Cuprammonium viscosity_____centipoises__ 16.1
Bleachability_____percent__ .25
Ash_____do____ .10

The purified cellulose derived from the above described process is dehydrated in a vessel such as that indicated by numeral 10 in Fig. 3. The vessel 10 is preferably constructed of material resistant to acetic acid. The diameter of the vessel used in connection with this description may, for example, be about 20 inches, and the height about 60 inches (above the top of a wire screen 11). The bottom 12 of the vessel 10 is preferably detachable to permit the removal of the cellulose cake after dehydration, and a perforated plate 13 on which lies the screen 11 (which may be about 50 mesh), is fitted into the vessel 10 to retain the cellulose in place.

About 30 pounds of cellulose, for example, is made into about a 6% water slurry, and the slurry is vigorously agitated until a uniform mixture of the pulp and water, and complete separation of any bundles or mats of fibers, have been effected. Approximately half of the pulp-water slurry is discharged into the dehydrator vessel 10 and the excess water is allowed to drain out through the bottom 12. A vacuum is ordinarily applied to the bottom 12 to aid in the removal of the free water from the pulp. When a substantial proportion of the water has thus been removed from the pulp, a pressure of about 25 pounds per square inch is exerted on top of the wet pulp by a plunger 14, resulting in the formation of a wet cake of cellulose about 7.9 inches thick having a uniform density of approximately 0.167 gram of cellulose per cubic centimeter. A second cake is formed exactly as described above from the second half of the pulp-water slurry, the two cakes together forming a column of cellulose about 15.8 inches in height and about 20 inches in diameter with a uniform density of about 0.167 gram of cellulose per cubic centimeter.

The vacuum is continued after the formation of the second cake until no further appreciable amount of water is discharged, and the temperature is then adjusted to about 25° C. About 40 pounds of glacial acetic acid at about 25° C. is then injected on top of the cake and allowed to soak into the pulp for approximately 5 minutes. It is then drawn through the cake by means of a partial vacuum applied at the bottom 12, and about 5 minutes following the addition of the acid 200 pounds of glacial acetic acid at a higher temperature, for instance 60° C., is injected on top of the cellulose cake and drawn through the cake by means of the vacuum. After about 45 minutes no appreciable further amount of liquor is discharged, and the dehydration is complete. This time may be shortened if desired by applying pressure to the top of the acid layer, of the order of 30 pounds per square inch, which pressure will reduce the time to about 15 minutes. It is preferred at this point in the operation to bring the total content of the dehydrator to about 60° to 70° C. by means of a steam jacket with which the dehydrator is preferably equipped, and to hold the temperature in about that range for approximately 15 minutes.

The first portion of the effluent from the cake is acid-free water and is diverted to some suitable waste to avoid excessive dilution of the acid subsequently discharged, which is preserved for re-use and/or recovery. The acid-wet cake of cellulose will contain approximately 96 pounds of glacial acetic acid while the remaining 144 pounds of the charge of glacial acid is mixed with a portion of the water displaced from the cellulose cake.

The acetic acid-saturated cellulose is removed from the dehydrator, weighed, and defibered preferably under conditions which avoid substantial exposure to moist air. It is then discharged, preferably through a closed conduit into a jacketed acetylator, for example, provided with efficient agitation means. The temperature adjusted to the order of 30° C. with agitation, and about 3.8 parts of about 99.7% acetic acid (or sufficient to make a total of about 7.0 parts of acid per part of cellulose, oven-dry basis) and about 0.026 par of sulfuric acid (sp. gr. 1.835) to each part of cellulose, are uniformly added over a period of the order of 15 minutes, while the agitation is continued and the temperature maintained at about 30° C. This part of the acetylation cycle is shown in Fig. 4, as portion AA' of the shorter curve. Sufficient acetic anhydride to make about 2.2 parts of 100% anhydride per part of cellulose is then added, preferably at a uniform rate in the order of 15 minutes. During the addition of the acetic anhydride, the temperature of the mass is increased uniformly to about 43° C., partly by the heat of reaction and partly by the application of heat by means of the acetylator jacket (portion A'B). The temperature of the mass is held at about 43° C. by the application of steam or cold water in the acetylator jacket for about 90 minutes (portion BB').

The acetylation reaction may be stopped at the desired point by adding about 2.2 parts of approximately 50% acetic acid containing about 0.062 part of concentrated sulfuric acid (sp. gr. 1.835) over a period of about 6 minutes. After the dilute acid and catalyst have been added, the temperature is raised to about 45° C. over a period of 10 minutes, agitation being continued throughout.

The mass is then discharged from the acetylator to a hydrolyzing tank where it is continuously agitated and held at about 45° C. until the desired acetyl content has been attained. For example, for a combined acetic acid content of 54.0%, hydrolysis is continued for approximately 22 hours. The hydrolysis is terminated by adding about 0.2 part of sodium acetate dissolved in about 1.1 parts of acetic acid. The acetic acid acetate solution may now be filtered if necessary. The acetate is then precipitated by allowing it to flow into water or dilute acetic acid. It is then washed free of acid in cold water and treated with water at about 90° C. for about 45 minutes, drained, and dried at about 60°–70° C.

The cellulose acetate obtained from wood in this manner will yield a solution in acetone having a color, depending on the purity of the cellulose, approximately 200 p. p. m., and a haze of less than 200 p. p. m. The acetone viscosity may vary from less than 1 second to 150 to 160 seconds or higher depending on the use for which the acetate is intended and the original cuprammonium viscosity of the cellulose employed in the production of the acetate.

For comparative purposes, a second curve DG' is shown in Fig. 4, this second curve representing a typical practice of acetylation employed for the production of cellulose acetate from cotton linters in the industry today.

Portion AA' of the first curve represents the treatment of the cellulose with catalyst. During this short period a rapid drop in cellulose viscosity occurs. However, as a result of the low temperature, short time and uniformity of the treatment, substantially no harmful degradation of the cellulose occurs. Portion DE of the second curve is comparable to BB' of the first curve in that it represents the usual treatment of cellulose with catalyst by the art. In this case, likewise, an appreciable reduction in viscosity occurs. However, the treatment is given under such conditions of time, temperature, etc., that it is continued considerably after the first rapid drop in viscosity of the cellulose. In this case a substantial degradation of the cellulose occurs.

Portion EE' of the second curve represents the step of adding the anhydride, with a control of temperature. Portion E'F represents a step of permitting a temperature rise. Portion FF" is another temperature control step. Portion F'G is a controlled temperature rise. Portions DG are accordingly analogous to portions AB on the first curve. Portion GG' represents a controlled temperature during which acetylation proceeds to completion, its counterpart being portioned BB' in the first curve.

Accordingly, portion DG' of the second curve, taking a total of about ten hours, is equivalent to portion AB' of the first curve, taking a total of about 2 hours. The superiority of the acetylation procedure of the present invention, from the standpoint of time consumed, is thus made apparent, particularly when it is considered that the long pretreatment step represented by portion DE of the second curve, occupying about five hours, is practically lacking from the time schedule of the first curve, representing the acetylation procedure of the present invention.

The foregoing example illustrated the application of the invention to black gum wood, but the invention is not confined to this species, nor to deciduous woods. Poplar, maple, birch, and other hardwoods may be used with equally satisfactory results, as well as coniferous woods, such as spruce and western hemlock, and any of the rapid growth pines predominating in the Atlantic states from Virginia southward and the Gulf states from Florida westward to Texas, including Arkansas and Tennessee.

One aspect of the present invention may be made more understandable by considering the morphology of wood. Most species of wood contain over 50% of noncellulosic impurities. These impurities, which include lignin, pentosan, pectin and the like, are distributed through the woody structure and even through the cell walls of the individual fibers in a highly complex manner, rendering substantial portions of the impurities quite difficultly accessible to reagents.

A currently accepted theoretical structure for a mature wood fiber is shown in cross section in Fig. 5. This wood fiber contains, first, an outer or intercellular substance indicated by numeral 20, a cambial or primary wall 21, an outer layer of secondary thickening indicated by numeral 22, a number of central layers of secondary thickening indicated by numerals 23, and an inner layer of secondary thickening indicated by numeral 24. The intercellular substance 20 is common to adjacent cells. Layers 20 and 21 are apparently made up of pectin in the meristimatic cell, but as the cells mature they become highly lignified. Layers 22 and 24 of the secondary thickening contain less lignin than layers 20 and 21, but more than layers 23. The central layers 23 are apparently made up of thin laminae of cellulose separated by even thinner layers of lignin and pectin. The laminae of central layers 23 are apparently further divided into threads of cellulose known as fibrils. Fig. 6 shows, in cross section, the probable arrangement of fibrils in the lamina. Numeral 25 indicates the individual fibrils and numeral 26 indicates the amorphous pectin separating the fibrils. Fig. 7 is a probable longitudinal section of a single fibril, showing cellulose particles 27 separated from each other by a thin layer of pectin 28. The lignin of the cell wall is dispersed in the pectin substance.

The wood fiber in its natural state in the tree is saturated with water and consequently is in a water-swollen condition. The tree is able to live and grow by virtue of the transmission and diffusion of liquid through the permeable and water-swollen fibers. When delignification and purification treatments to remove the noncellulosic impurities from these water-swollen wood fibers are properly applied, as in the process of the present invention, the porosity and consequently the permeability of the fibers tends to increase as a result of the enlargement of the existing openings and the creation of new channels between the cellulose units in the fibers by the removal of the noncellulosic material. Thus, when the impurities are removed, the swollen fiber virtually becomes a honey-combed or skeletal structure of relatively pure cellulose. While in this state, in which the moisture content has been maintained above 30%, the fiber is in an ideal condition for esterification, all parts of the cellulose being easily accessible and reactive to esterifying reagents.

However, if the fiber is dried before acetylation, as is common in the usual known methods of the prior art, the inherent permeability, maintained in the living tree and improved during purification, is greatly reduced or substantially lost due to a shrinking action which sets in during the drying methods commonly used in the prior-art practices. The shrinkage tends to close the pores in the fibers so that they become impermeable to acetylating reagents and the cellulose must then be treated in order to make it reactive to the reagents. The treatments usually applied for this purpose, because of their drasticity, usually result in an inferior derivative product.

If the cellulose is not completely purified, as in the present invention, the result of the drying would be even more harmful since the amorphous impurities tend to set up highly inpenetrable membranes (probably difficultly reversible gels) and obstructions which prevent accessibility to and reaction between the cellulose and the esterifying reagents. Any appreciable amount of such amorphous material, upon drying, renders the cellulose unreactive to esterifying reagents and even when very drastic pretreating conditions do render the material acetylatable, the cellulose is so highly degraded by the pretreatment imposed that a very inferior derivative product is obtained.

In the process of the present invention, the formation of such relatively impenetrable membranes or difficultly reversible gels is avoided by avoiding any drying which tends to form such membranes or gels. For example, drying is deliberately avoided between the last step in the purification of the cellulose and the first step in its acetylation, by means of the dehydration procedure described, using glacial acetic acid to mechanically displace the water in the cellulose. By avoiding drying, the formation of the impenetrable membranes and difficultly reversible gels is avoided, even though, in the present invention, some pectic and like impurities are still present in the cellulose. Furthermore, the process of the present invention provides that such impurities as are present are uniformly and homogeneously distributed throughout the fiber structure of the cellulose. This factor appears to be of importance in securing reactive, or acetylatable, cellulose of a relatively impure chemical composition.

The viscosity of the cellulose solutions has long been considered as associated with the state of complexity of the cellulose molecules. By control of viscosity is usually meant the regulation of the digestion and/or purification of the cellulose in such a way that the original lengths of the cellulose chains are maintained or reduced to any desired extent.

However, a more adequate consideration of the significance of viscosity control seems to require two conceptions:

1. The change in viscosity obtained by separating the long chain cellulose molecules in the bundles from each other by destroying the secondary valence forces holding them together. This action will be designated as "splitting".

2. The reduction in viscosity obtained by depolymerization, which involves breaking the primary valence bonds and thereby reducing the chain lengths of the individual cellulose molecules. This action will be designated as "scission".

In preparing celluloses for esterification where for various technological reasons it is desired to stay within a certain viscosity range, and especially where the highest ranges of viscosity are required with reactive cellulose, it is desirable to employ controls in purification which result in a "splitting" of the secondary valences rather than a "scission" of the primary valence bonds.

The acetates of the present invention possess a homogeneity and uniformity not heretofore attainable, costly and time consuming filtration requirements are reduced, and for many acetate uses, may be eliminated, due to the substantial freedom of those unacetylated fibers and/or particles typical of the solutions of the acetates derived from the processes of the prior art, and the substantial freedom from products of acetolysis.

As many changes could be made in carrying out the above compositions and processes without departing from the scope of the invention, it is intended that all matter contained in the above description or shown in the accompanying drawings shall be interpreted as illustrative and not in a limiting sense.

We claim:

1. The process for the production of acetylatable cellulose from wood comprising subjecting wood in desired subdivision to a mild acid sulfite digestion terminated with the resulting pulp at a bleachability not exceeding 35%, chlorinating said pulp, removing the chlorination products by treatment with an alkaline solution, subjecting the treated pulp to a hypochlorite bleach, treating the chlorinated bleached pulp in an alkaline solution of the order of 7% concentration of sodium hydroxide at a temperature above 30°–120° C., washing said pulp and dehydrating by treatment with an organic medium and including subjecting the pulp to a temperature of the order of 25° C. to 60° C. in contact with acetic acid to increase the reactivity of the cellulose, so that said cellulose when mixed with a sulfuric acid catalyst is acetylatable in about four hours at 40° C. with substantially 2.2 parts of acetic anhydride.

2. A process for the production of acetate from wood comprising subjecting wood in desired subdivision to a mild acid sulfite digestion terminated with the resulting pulp at a bleachability not exceeding 35%, chlorinating said pulp, removing the chlorination products by treatment with an alkaline solution, subjecting the treated pulp to a hypochlorite bleach, treating the chlorinated bleached pulp in an alkaline solution of the order of 7% concentration of sodium hydroxide at a temperature above 50° C., washing said pulp and dehydrating by treatment with an organic medium and including subjecting the pulp to a temperature of 60° C. or over in contact with acetic acid to increase the reactivity of the cellulose, mixing said pulp with acetic acid and a sulfuric acid catalyst in less than an hour and acetylating said pulp in about four hours with substantially 2.2 parts of acetic anhydride.

3. Wood cellulosic material resulting from the process set forth in claim 1 and being unmercerized and having an alpha cellulose content of the order of 94% to 97%, 2% to 6% soda soluble material, a bleach value of less than 1% and a pentosan content of 2% to 3%.

LIONEL ELMER GOFF.
LYLE MELVIN SHELDON.
MILTON LAWRENCE HERZOG.
FREDRICH OLSEN.